US011328726B2

(12) United States Patent
Pramanick et al.

(10) Patent No.: US 11,328,726 B2
(45) Date of Patent: May 10, 2022

(54) CONVERSATIONAL SYSTEMS AND METHODS FOR ROBOTIC TASK IDENTIFICATION USING NATURAL LANGUAGE

(71) Applicant: Tata Consultancy Services Limited, Mumbai (IN)

(72) Inventors: Pradip Pramanick, Kolkata (IN); Chayan Sarkar, Kolkata (IN); Balamuralidhar Purushothaman, Bangalore (IN); Ajay Kattepur, Bangalore (IN); Indrajit Bhattacharya, Kolkata (IN); Arpan Pal, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 142 days.

(21) Appl. No.: 17/009,317

(22) Filed: Sep. 1, 2020

(65) Prior Publication Data

US 2021/0110822 A1    Apr. 15, 2021

(30) Foreign Application Priority Data

Oct. 11, 2019  (IN) .............................. 201921041305

(51) Int. Cl.
*G06F 17/00*     (2019.01)
*G10L 15/22*     (2006.01)
(Continued)

(52) U.S. Cl.
CPC ............ *G10L 15/22* (2013.01); *G06F 40/205* (2020.01); *G06F 40/30* (2020.01)

(58) Field of Classification Search
None
See application file for complete search history.

(56) References Cited

U.S. PATENT DOCUMENTS 10,249,207 B2 * 4/2019 Solomon ................... G09B 7/04
10,527,437 B2 * 1/2020 Epperlein .............. G01C 21/20
(Continued)

FOREIGN PATENT DOCUMENTS

KR    20120061014 A    6/2012
KR    20170095583 A    8/2017

OTHER PUBLICATIONS

Nyga, Daniel et al., "Grounding Robot Plans from Natural Language Instructions with Incomplete World Knowledge", Proceedings of The 2nd Conference on Robot Learning, 2018, Oct. 29-31, 2018, http://procsedings.mlr.press/V87/nyga18a/nyga18a.pdf.
(Continued)

*Primary Examiner* — Satwant K Singh
(74) *Attorney, Agent, or Firm* — Finnegan, Henderson, Farabow, Garrett & Dunner, LLP

(57) ABSTRACT

This disclosure relates generally to human-robot interaction (HRI) to enable a robot to execute tasks that are conveyed in a natural language. The state-of-the-art is unable to capture human intent, implicit assumptions and ambiguities present in the natural language to enable effective robotic task identification. The present disclosure provides accurate task identification using classifiers trained to understand linguistic and semantic variations. A mixed-initiative dialogue is employed to resolve ambiguities and address the dynamic nature of a typical conversation. In accordance with the present disclosure, the dialogues are minimal and directed to the goal to ensure human experience is not degraded. The method of the present disclosure is also implemented in a context sensitive manner to make the task identification effective.

17 Claims, 10 Drawing Sheets

(51) Int. Cl.
*G06F 40/205* (2020.01)
*G06F 40/30* (2020.01)

(56) References Cited

U.S. PATENT DOCUMENTS

2016/0247068 A1* 8/2016 Lin .................... G06F 40/40
2018/0293483 A1* 10/2018 Abramson ............. H04L 51/02
2020/0027456 A1* 1/2020 Kim ...................... G06N 5/025
2020/0036810 A1* 1/2020 Howard ................ G06N 5/022

OTHER PUBLICATIONS

Lemaignanab, Séverin et al., "Artificial cognition for social human-robot interaction: An implementation", Jun. 2017, pp. 45-69, vol. 247, Elsevier B.V., https://www.sciencedirect.com/science/article/pii/S0004370216300790.

Galindo, Cipriano et al., "Robot Task Planning using Semantic Maps", Robotics and Autonomous Systems, Nov. 2008, vol. 56, No. 11, ACM, Inc., http://citeseerx.ist.psu.edu/viewdoc/download?doi=10.1.1.139.9216&rep=rep1&type=pdf.

Thomason, Jesse et al., "Learning to Interpret Natural Language Commands through Human-Robot Dialog", IJCAI'15: Proceedings of the 24th International Conference on Artificial Intelligence, 2015, ACM, Inc., https://www.aaai.org/ocs/index.php/IJCAI/IJCAI15/paper/view/11376/10932.

* cited by examiner

CONVERSATIONAL SYSTEMS AND METHODS FOR ROBOTIC TASK IDENTIFICATION USING NATURAL LANGUAGE

PRIORITY CLAIM

This U.S. patent application claims priority under 35 U.S.C. § 119 to: Indian Patent Application No. 201921041305, filed on 11 Oct. 2019. The entire contents of the aforementioned application are incorporated herein by reference.

TECHNICAL FIELD

The disclosure herein generally relates to human-robot interaction (HRI), and, more particularly, to conversational systems and methods for robotic task identification using a natural language based conversation.

BACKGROUND

Robots being deployed in our daily surroundings for routine chores is ever-increasing. Even in an industrial setup, the use of coworker robots is increasing rapidly. Such cohabitant robots perform various tasks as instructed by collocated human beings. A natural interaction mechanism plays a big role in the usability and acceptability of the robot, especially by a non-expert user. The goal of human-robot interaction (HRI) is not focused on generating a response to queries, but it often involves performing some tasks in the physical world. Therefore, identification of tasks to be performed based on the interaction is a critical aspect that leads to achieving a goal state.

Natural language processing (NLP) has enabled robots to interact with human cohabitants and collaborators in natural language. However, the ambiguity present in natural language makes it very difficult for a robot to fully interpret the task goals and perform the task conforming to the human intention. Human beings generally converse in short sentences, often with many implicit assumptions about the task context. Restricted natural language based interaction with the robot is used to address this issue in the art. However, in a multi-purpose robot, the set of capabilities can be large and programming the robot for each and every task is cumbersome. Moreover, restricted natural language limits usability and acceptability of the robot, especially in daily surroundings like home, office, hospital, restaurants, and the like.

SUMMARY

Embodiments of the present disclosure present technological improvements as solutions to one or more of the above-mentioned technical problems recognized by the inventors in conventional systems.

In an aspect, there is provided a processor implemented method for robotic task identification using a natural language based conversation, the method comprising the steps of: predicting, via one or more hardware processors serving as a first multiclass classifier, an intent associated with an utterance in a natural language, wherein the utterance initiates a session being a unit of the natural language based conversation, with the intent being one of an instruction, a greeting, a statement or a general query pertaining to a current state of a robot or environment thereof represented by a world model comprised in a Knowledge Base; responding, via the one or more hardware processors, to the predicted intent by performing at least one of: identifying a task, if the predicted intent is the instruction to perform the task, wherein the task is associated with a task type, and wherein the task type is associated with at least one mandatory argument having a value associated thereof; initiating a mixed-initiative dialogue with a human to confirm the identified task, if the predicted task type is associated with a confidence score equal to or below an empirically determined threshold; and providing a response from a predefined response template comprised in the Knowledge Base, if the identified intent is one of the greeting, the statement, the general query pertaining to the current state of the robot or environment thereof; and obtaining, via the one or more processors, the value associated with each of the at least one mandatory argument based on a task template for the identified task and the world model, the task template being comprised in the Knowledge Base; generating, via the one or more processors, a context aware input to a task planner for the identified task, wherein the context aware input is a task plan generated using a pre-condition template and a post-condition template from the Knowledge Base for the identified task, the value associated with each of the at least one mandatory argument and the world model; and completing, via the one or more processors, the session based on one of execution of the generated task plan based on the task plan, or generating a communication indicative of either a session closing greeting, inability of the robot to execute the identified task or failure to parse the utterance.

In another aspect, there is provided a system robotic task identification using a natural language based conversation, the system comprising: one or more data storage devices operatively coupled to one or more hardware processors and configured to store instructions configured for execution via the one or more hardware processors to: predict, via a first multiclass classifier, an intent associated with an utterance in a natural language, wherein the utterance initiates a session being a unit of the natural language based conversation, with the intent being one of an instruction, a greeting, a statement or a general query pertaining to a current state of a robot or environment thereof represented by a world model comprised in a Knowledge Base; respond to the predicted intent by performing at least one of: identifying a task, if the predicted intent is the instruction to perform the task, wherein the task is associated with a task type, and wherein the task type is associated with at least one mandatory argument having a value associated thereof; initiating a mixed-initiative dialogue with a human to confirm the identified task, if the predicted task type is associated with a confidence score equal to or below an empirically determined threshold; and providing a response from a predefined response template comprised in a Knowledge Base, if the identified intent is one of the greeting, the statement, the general query pertaining to the current state of the robot or environment thereof; and obtaining the value associated with each of the at least one mandatory argument based on a task template for the identified task and the world model, the task template being comprised in the Knowledge Base; generate a context aware input to a task planner for the identified task, wherein the context aware input is a task plan generated using a pre-condition template and a post-condition template from the Knowledge Base for the identified task, the value associated with each of the at least one mandatory argument and the world model; and complete the session based on one of execution of the generated task plan based on the task plan, or generating a communication indicative of either a session closing greeting, inability of the robot to execute the identified task or failure to parse the utterance.

In yet another aspect, there is provided a computer program product comprising a non-transitory computer readable medium having a computer readable program embodied therein, wherein the computer readable program, when executed on a computing device, causes the computing device to: predict, via a first multiclass classifier, an intent associated with an utterance in a natural language, wherein the utterance initiates a session being a unit of the natural language based conversation, with the intent being one of an instruction, a greeting, a statement or a general query pertaining to a current state of a robot or environment thereof represented by a world model comprised in a Knowledge Base; respond to the predicted intent by performing at least one of: identifying a task, if the predicted intent is the instruction to perform the task, wherein the task is associated with a task type, and wherein the task type is associated with at least one mandatory argument having a value associated thereof; initiating a mixed-initiative dialogue with a human to confirm the identified task, if the predicted task type is associated with a confidence score equal to or below an empirically determined threshold; and providing a response from a pre-defined response template comprised in a Knowledge Base, if the identified intent is one of the greeting, the statement, the general query pertaining to the current state of the robot or environment thereof; and obtaining the value associated with each of the at least one mandatory argument based on a task template for the identified task and the world model, the task template being comprised in the Knowledge Base; generate a context aware input to a task planner for the identified task, wherein the context aware input is a task plan generated using a pre-condition template and a post-condition template from the Knowledge Base for the identified task, the value associated with each of the at least one mandatory argument and the world model; and complete the session based on one of execution of the generated task plan based on the task plan, or generating a communication indicative of either a session closing greeting, inability of the robot to execute the identified task or failure to parse the utterance.

In accordance with an embodiment of the present disclosure, the one or more processors are further configured to pre-process the utterance before predicting the intent associated with the utterance and before identifying a task by performing one or more of tokenization, Part-Of-Speech (POS) tagging, Dependency parsing, stop word removal, tf-idf (term frequency-inverse document frequency) and coreference resolution.

In accordance with an embodiment of the present disclosure, the one or more processors are further configured to identify the task by: parsing the instruction to predict the task type using a second multiclass classifier; and obtaining the at least one mandatory argument associated with the predicted task type, if the predicted task type is associated with the confidence score above the empirically determined threshold, by performing one of: identifying the at least one mandatory argument using a third multiclass classifier; and predicting the at least one mandatory argument using a fourth multiclass classifier without a task type association feature function.

In accordance with an embodiment of the present disclosure, the one or more processors are further configured to perform the step of initiating the mixed-initiative dialogue with the human to confirm the identified task by performing one or more of: dynamically generating a set of questions based on a first question template for confirming the predicted task type by the human; providing one or more alternate task types from the Knowledge Base in the form of one or more binary questions, based on likelihood of the alternate task types being a true task type; and confirming similarity of the instruction to one or more tasks in the Knowledge Base.

In accordance with an embodiment of the present disclosure, the one or more processors are further configured to obtain the at least one mandatory argument by initiating the mixed-initiative dialogue with the human to obtain a missing value associated with the obtained at least one mandatory argument by dynamically generating a set of questions based on i) a second question template and synonyms of the identified task, if the at least one mandatory argument is shared across multiple task types or ii) a predefined set of questions, if the at least one mandatory argument is a unique argument for the identified task.

In accordance with an embodiment of the present disclosure, the one or more processors are further configured to provide one or more alternate task types by: obtaining a count associated with each task type in the Knowledge Base; dynamically assigning a probability to each task type using linguistic features of associated instruction, such that a sum of assigned probabilities is 1; ranking each task type in an order of decreasing probability; and generating a question for each task based on a rank associated thereof by replacing a verb slot in the instruction with a verb for an associated task and replacing slots of the one or more arguments with the predicted one or more arguments.

In accordance with an embodiment of the present disclosure, the utterance is a new utterance in the natural language by the human received as a modified form of the instruction or a new instruction, in response to the one or more binary questions from the dynamically generated set of questions.

In accordance with an embodiment of the present disclosure, the first multiclass classifier is a logistic regression classifier; and the second multiclass classifier, the third multiclass classifier and the fourth multiclass classifier are each a Conditional Random Field (CRF) model.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
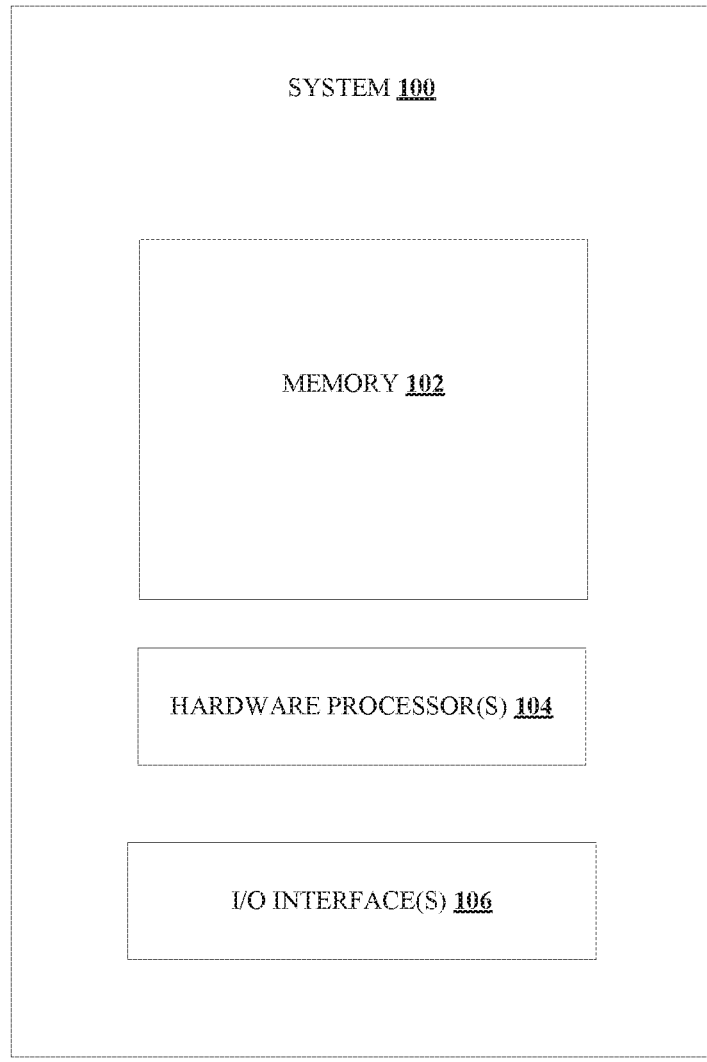
FIG. 1 illustrates an exemplary block diagram of a system for robotic task identification using a natural language based conversation, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Recent advancements in natural language processing (NLP) has enabled robots to interact with human cohabitants and collaborators in natural language. Being able to execute tasks that are conveyed in natural language is the most sought after feature in modern robotics. A robot is required to understand a human given task and generate a viable execution plan to complete it. An NLP engine is a necessary part of this execution, but not sufficient. There are multiple issues that need to be addressed.

Firstly, a general purpose NLP tool provides semantic details of a natural language, but is not accompanied by a mechanism that can classify a generic sentence as a task for the robot, identify type of task, and parameters or arguments hidden within the sentence. This requires a domain-specific knowledge of the world where the robot is operating and also a capability set of the robot. Most of the existing chatbots are trained with query-response pairs and a given query is classified to such a predefined pair. A robotic task instruction requires a set of pre-conditions and post conditions to be satisfied, which varies significantly with the number of conditions and task context. As a result, the state-of-the-art approach of classifying a task instruction to a predefined task-action pair is not sufficient.

Secondly, the ambiguity in any natural conversation poses a challenge in identifying human intention using one-way interaction. Human beings generally converse in short sentences and often with many implicit assumptions about the task context adding to the challenge. Thus, a bidirectional conversation which is also a mixed-initiative dialogue is needed for the conversation to be meaningful.

Systems and methods of the present disclosure are directed towards identifying robotic task using natural language. In accordance with the present disclosure, the natural language need not be restricted or controlled and thus is close to a typical human conversation and can find application in daily surroundings like home, office, hospital, restaurants, and the like. In the context of the present disclosure, a text-based (natural language) input-output is considered. However, any audio-to-text and text-to-audio system may be coupled to the systems of the present disclosure for vocal conversation. In the context of the present disclosure, the expressions 'human', 'user', 'non-expert user' may be used interchangeably.

Referring now to the drawings, and more particularly to FIG. 1 through FIG. 9, where similar reference characters denote corresponding features consistently throughout the figures, there are shown preferred embodiments and these embodiments are described in the context of the following exemplary system and/or method.

FIG. 1 illustrates an exemplary block diagram of a system for robotic task identification using a natural language based conversation, in accordance with some embodiments of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, hand-held devices, workstations, mainframe computers, servers, a network cloud and the like.

I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

Figure 2:
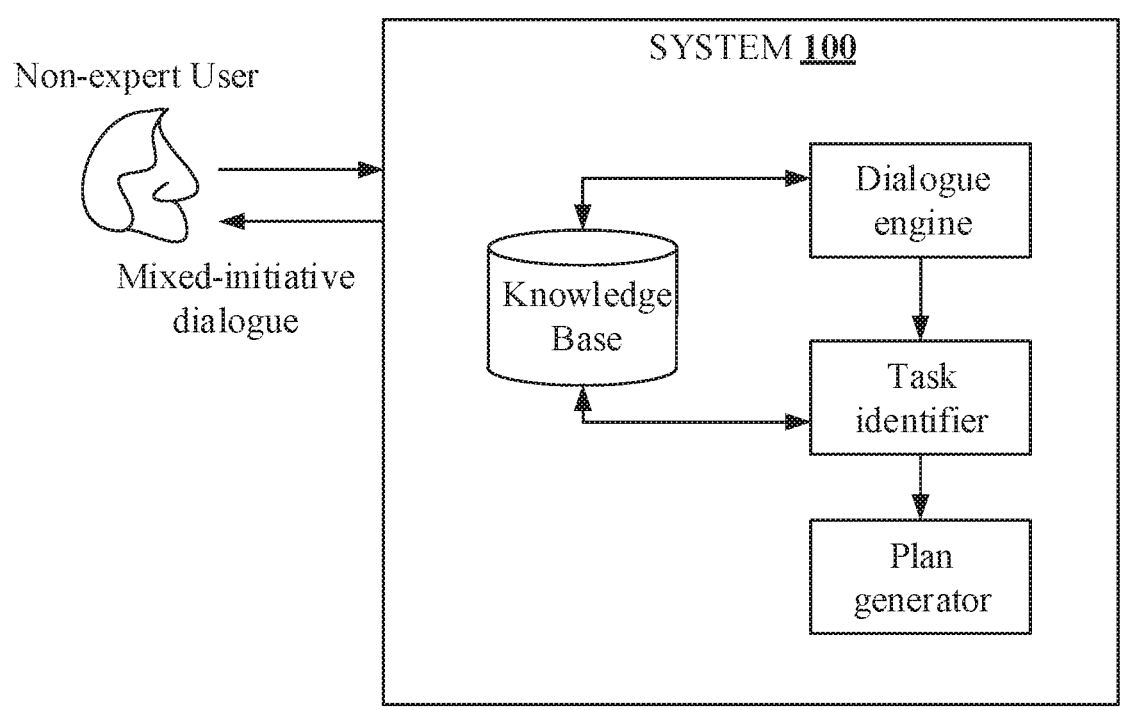
FIG. 2 illustrates a functional block diagram for the system of FIG. 1, in accordance with some embodiments of the present disclosure.
Figure 3A:
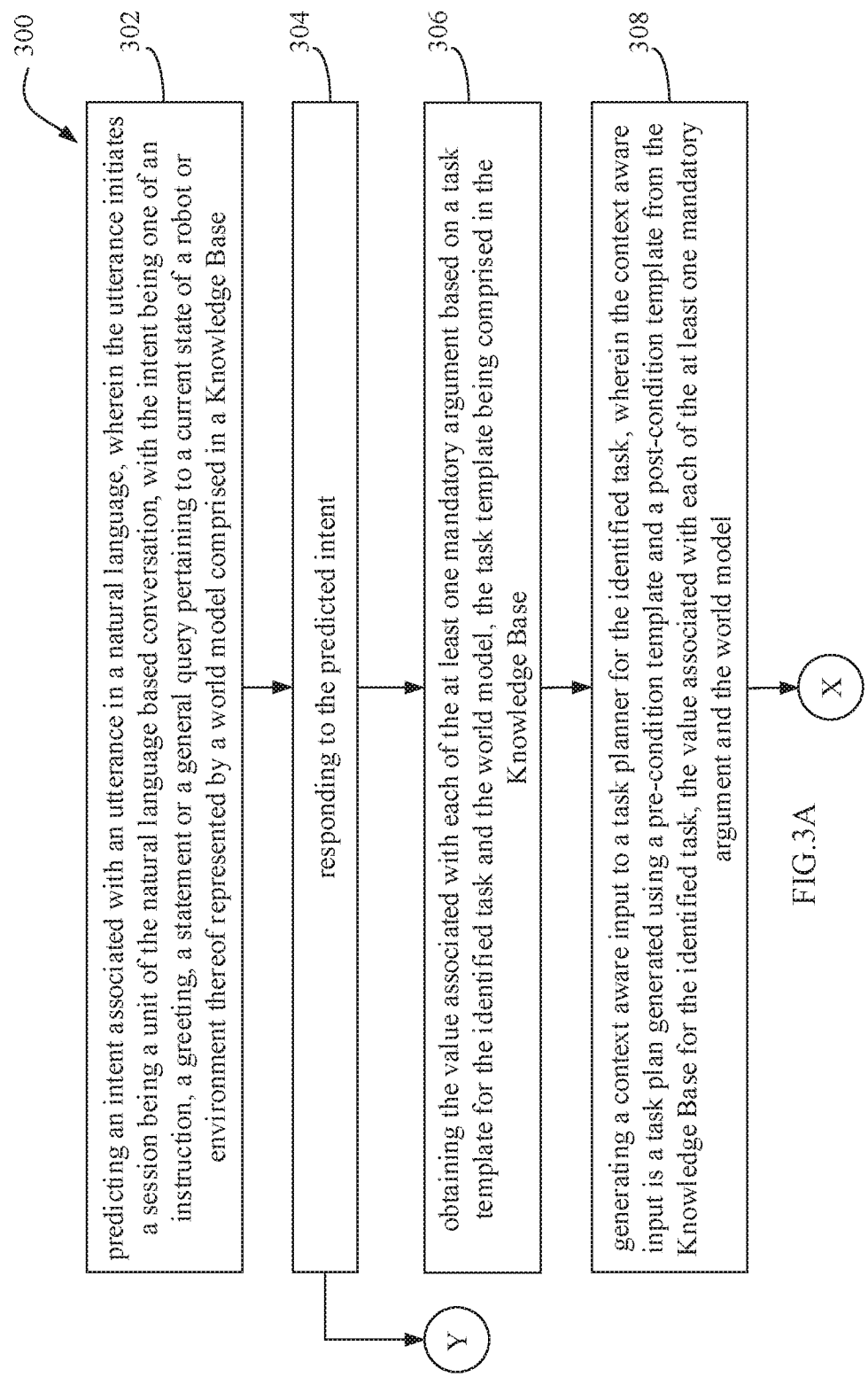
FIG. 3A through FIG. 3B illustrate an exemplary flow diagram of a computer implemented method for robotic task identification using a natural language based conversation, in accordance with some embodiments of the present disclosure.
Figure 3B:
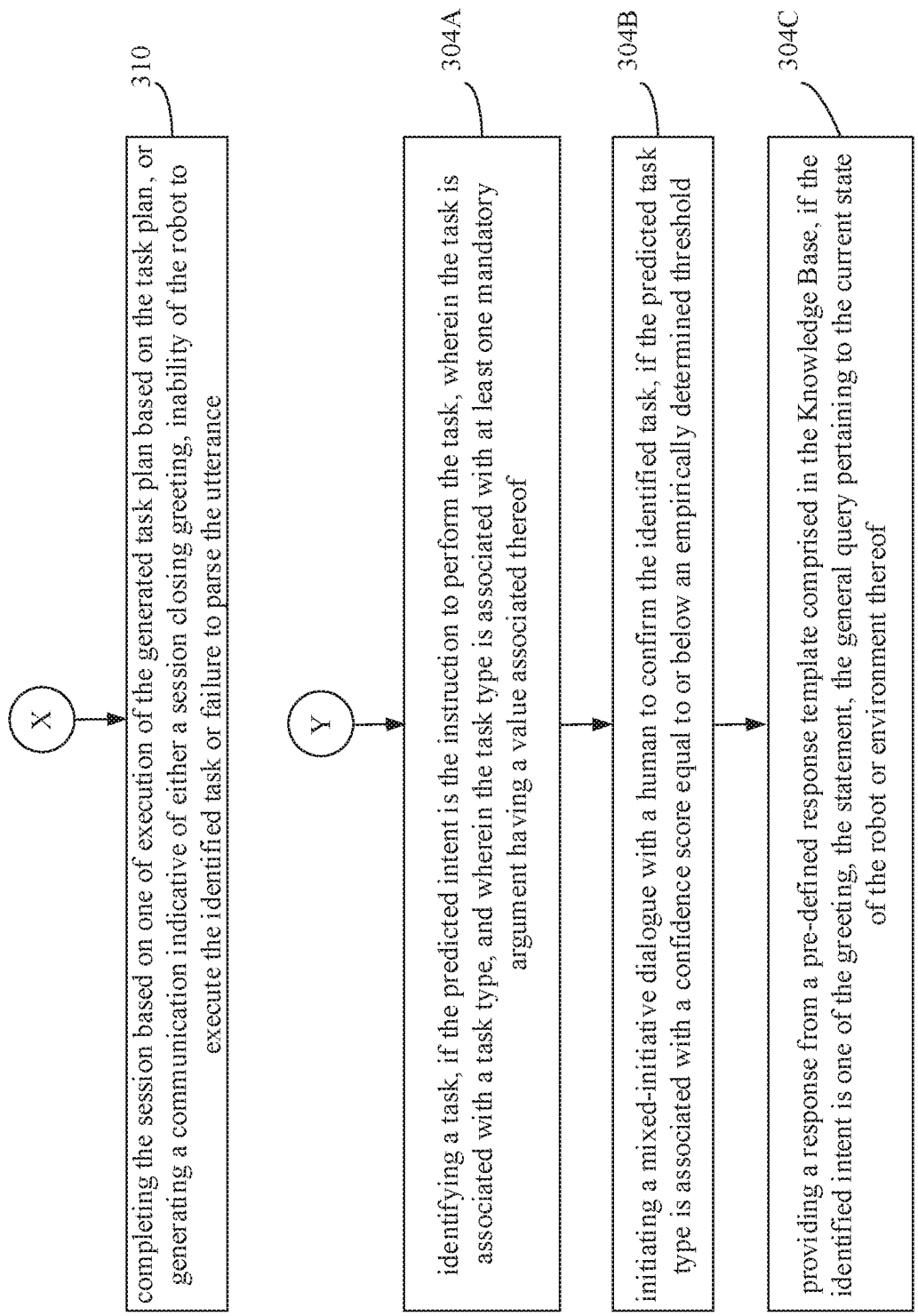

FIG. 2 illustrates a functional block diagram 200 for the system of FIG. 1 while FIG. 3A through FIG. 3B illustrate an exemplary flow diagram of a computer implemented method 300 for robotic task identification using a natural language based conversation, in accordance with some embodiments of the present disclosure. In an embodiment, the system 100 includes one or more data storage devices or memory 102 operatively coupled to the one or more processors 104 and is configured to store instructions configured for execution of steps of the method 300 by the one or more processors 104. The steps of the method 300 will now be explained in detail with reference to the components of the system 100 of FIG. 1 and the functional block diagram 200 for the same. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

As shown in FIG. 2, in an embodiment, the functional blocks, at a high level, mainly include the one or more hardware processors configured to form a Dialogue engine, a Task identifier and a Plan generator and a Knowledge Base comprised in the one or more data storage devices (102 of FIG. 1). The Dialogue engine is configured to handle bidirectional interaction (mixed-initiative dialogue) between the robot and the human (possibly a non-expert user). The Dialogue engine comprises a set of generic NLP tools that extract features from an utterance received from the human. Relevant questions are formulated for the user to resolve ambiguity in task understanding. If a human says, "Take the book from the table", the NLP tools process it to provide the following output consisting of grammatical features. (Take, VB, root), (the, DT, det), (book, NN, dobj), (from, IN, prep), (the, DT, det), (table, NN, probj).

The Task identifier is configured to identify an intended task and relevant arguments from the interaction. To remove ambiguity and to understand semantic information provided by the NLP tools, a common vocabulary has to be agreed upon by the robot and the human. Even though the human provides the instruction in natural language, the same is converted to an intermediate representation (with uncertainty) that the robot can store and process. Frame Semantics theory is used to achieve the task modeling. The Frame Semantics model an event in the physical world as a frame, which completely describes the event using participating entities called frame elements. For instance, an event of taking an object from a location is modeled with a taking frame. To describe the event, the frame elements theme and source are used, where theme represents the object affected by the event and source represents a location where the theme is present. Thus, when the output of the NLP tool is processed by the task identifier, it produces the following output.

[Take]$_{taking}$[the book]$_{theme}$[from the table]$_{source}$.

A multiclass classifier is used to identify the frame and the frame elements. If the classifier fails to substantiate with sufficient confidence, the human is asked relevant questions to resolve the ambiguity and missing information.

The Plan generator is configured to ensure a context aware input is generated for a task planner for the identified task. One-to-one mapping may not be possible between a human intended task and the primitive actions supported by the robot, because a high-level task goal may require performing a sequence of sub-tasks. To enable task, a state of a world model (explained later in the description) is exposed to the robot in terms of grounded fluents, which are logical predicates that may have variables as arguments. A task starts from an initial state of the world model and leads to a different state of the world model, namely a goal state.

Since training data for robotic tasks instructions are scarce for most application domains, a set of probabilistic classifiers that does not require a large volume of training data is used. In accordance with an embodiment of the present disclosure, the one or more processors 104, serving as a first multiclass classifier, are configured to predict, at step 302, an intent associated with an utterance in a natural language, wherein the utterance initiates a session. In accordance with the present disclosure, the session is a unit of the natural language-based conversation and the intent may be one of an instruction, a greeting, a statement or a general query pertaining to a current state of a robot or environment thereof represented by the world model.

In accordance with an embodiment of the present disclosure, some high-level intents may be as shown in Table I below:

TABLE I

| High level intents | |
|---|---|
| Intent | Description |
| Welcome_greetings | General greetings of a welcoming note |
| Question_on_self | Question about the robot's capabilities |
| Wh_general | Questions unrelated to the robot |
| Instruction | Instruction to perform a task |
| Question_own_location | Questions about the robot's current location |
| Bye_greetings | Statements denoting the user wants to leave |

In accordance with present disclosure, the world model represents a current state of the world or environment where the robot is operating. A model of the robot is characterized by the robot's capabilities (e.g. picking) and constraints (e.g. can pick 10 kg). In an embodiment of the present disclosure, the model of the robot, the world model, task templates (described later in the description) for plan generation and pre-defined response templates (described later in the description) are comprised in the Knowledge Base. In an embodiment, the Knowledge Base is comprised in the one or more data storage devices 102. The Knowledge Base is crucial to the intelligence the robot derives for making context sensitive conversation and hence effective task identification based on the conversation, wherein the context sensitive capabilities are based on at least the model of the robot and the world model. Thus, at step 302, a high-level classification of the intent is performed to predict intention of the human at every point of interaction. Based on the human's intent and context derived from the Knowledge Base, dialogue with the human moves forward to various designated states as illustrated in FIG. 4, wherein a flowchart of an overall dialogue flow, in accordance with some embodiments of the present disclosure is illustrated.

Figure 4:
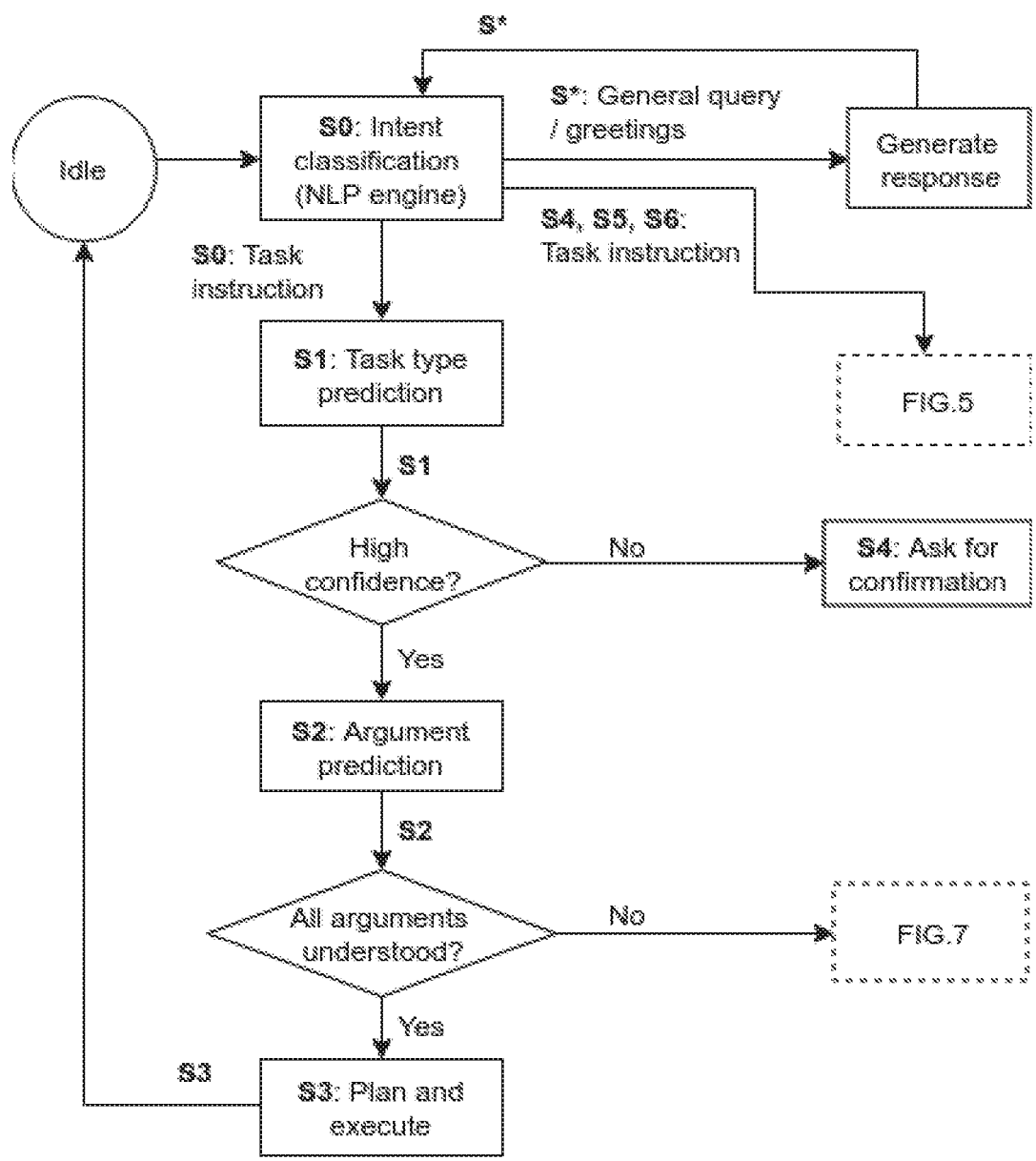
FIG. 4 illustrates a flowchart of an overall dialogue flow, in accordance with some embodiments of the present disclosure.

In accordance with an embodiment of the present disclosure, the overall dialogue flow is modeled as a state machine and is represented in FIG. 4. The state machine may consist of several dialogue strategies that are directed to ensure a concise and meaningful conversation with the human. The dialogue strategies serve as a guideline of what needs to be asked in a particular situation and how it should be asked. FIG. 4 illustrates primary components of the state, wherein S0 represents an Intent classification state wherein initially the human takes an initiative to start a dialogue.

In accordance with an embodiment of the present disclosure, the step 302 of predicting an intent associated with an utterance is preceded by pre-processing the utterance, wherein the pre-processing comprises one or more of tokenization, Part-Of-Speech (POS) tagging, Dependency parsing, stop word removal, tf-idf (term frequency-inverse document frequency) and coreference resolution. In an embodiment, the first multiclass classifier is a logistic regression classifier. Accordingly, given an utterance, at step 302, a probabilistic prediction of the human's intention is provided. The intent prediction is modeled as a text classification problem, wherein the first multiclass classifier takes training data D as a set of pairs of an utterance $X_i$ and a corresponding intent $Y_i$, i.e. $D=\{x_i,y_i\}_i^{N}=1$. In an embodiment, the first multiclass classifier, say, the logistic regression classifier, is trained with a stochastic gradient descent algorithm and word n-grams as features for the prediction. During the prediction, given an utterance x, an associated intent y is predicted as, $$y = \underset{y_i \in D}{\mathrm{argmax}} P(y_i \mid x),$$

wherein the intents may be as illustrated in Table I above.

In accordance with an embodiment of the present disclosure, the one or more processors 104 are configured to respond, at step 304, to the intent predicted at step 302. The step of responding may include a step 304A of identifying a task, if the predicted intent is the instruction to perform the task. In an embodiment, the step of identifying a task is also preceded by pre-processing the utterance using tf-idf (term frequency-inverse document frequency). In an embodiment of the present disclosure, the task is associated with a task type and the task type is in turn associated with at least one mandatory argument having an associated value. There may be more than one mandatory arguments and sometimes one or more optional arguments. For instance, the utterance may be, "Take the book from the table" or "Take the book from the table slowly". For a task type 'take', the source location 'table' is a mandatory argument. However, 'slowly' may be treated as an optional argument. Accordingly, if the intent is predicted to be a task instruction, the dialogue flow goes ahead to a Task type prediction (S1) state. If the predicted task type is associated with a confidence score above an empirically determined threshold, the dialogue flow goes ahead to an Argument prediction (S2) state. If the predicted task type is associated with a confidence score equal to or below the empirically determined threshold, a mixed-initiative dialogue is initiated at step 304B with the human to confirm the identified task. Alternatively, if the identified intent is one of the greeting, the statement, the general query pertaining to the current state of the robot or environment thereof (as shown in Table I above), a response from a pre-defined response template comprised in the Knowledge Base, may be provided at step 304C. For instance, if the intent predicted is question_own_location, the Knowledge Base, which is continually updated, is consulted for the robot's current location and a response is generated. Again, if the intent predicted is question_on_self, manipulation capabilities of the robot are listed. For a wh_general intent, the robot may respond that it is incapable of answering such questions. For the greeting intents, a response is selected randomly from a set of pre-defined responses.

In accordance with an embodiment of the present disclosure, the step 304A of identifying a task comprises parsing the instruction, at step 304A-1, to predict the task type using a second multiclass classifier followed by obtaining the at least one mandatory argument associated with the predicted task type, at step 304-2, if the predicted task type is associated with the confidence score above the empirically determined threshold. Given a piece of syntactically tagged text (tokens) obtained after the pre-processing of the utterance, the task type and corresponding one or more arguments are predicted. This is formulated as a classification problem to classify a word or a phrase to a task type or an argument. In an embodiment, the second multiclass classifier is a Conditional Random Field (CRF) model. In accordance with an embodiment of the present disclosure, the step 304-2 of obtaining the at least one mandatory argument comprises identifying the at least one mandatory argument using a third multiclass classifier. Alternatively, the at least one mandatory argument may be predicted using a fourth multiclass classifier without a task type associated feature function. In an embodiment, the third multiclass classifier and the fourth multiclass classifier are each a CRF model.

As mentioned above, the parsing of the instruction is done in two sequential stages—task type prediction and argument extraction. The task type prediction stage predicts possible sequences of frames in a given text. Then the argument extraction stage predicts sequences of frame elements in the text, given the prediction of possible frames in a previous stage. The predicted sequences are labeled by predicting IOB tags for each token of the text that denotes whether the token is inside (I), outside (O) or at the beginning (B) of a label. For the task type prediction stage, the training data may be given as, $[s_j=[w_i, tt_i]_{i=1}^{M}]_{j=1}^{N}$, wherein a sentence $s_j$ is given by a M×2 matrix containing words $w_i$ and their corresponding IOB tag of the task type $tt_i$ and N is the number of sentences in the training data. For the argument extraction phase, the training data may be given as, $[s_j=[w_i, T_i, at_i]_{i=1}^{M}]_{j=1}^{N}$, wherein $T_i$ is the predicted task type associated with the word $w_i$ and $at_i$ is the IOB tag of the argument. The CRF model for task type identification defines a conditional probability distribution as, $P(tt_{1:M}|w_{1:M}) = \propto \exp(\Sigma_M \Sigma_K W_k \emptyset_k(tt_{i-1}, tt_i, w_i))$, wherein $\emptyset_k$ is the $k^{th}$ component of the feature function, k is the number of features, $W_k$ is the weight of the $k^{th}$ feature and $\propto$ is a normalization factor. The weights are learned from the training data using a gradient descent optimization. For the argument extraction stage, the CRF model defines the conditional probability distribution as, $P(at_{1:M}|w_{1:M}) = \propto \exp(\Sigma_M \Sigma_K W_k \emptyset_k(at_{i-1}, at_i, w_i, T_i))$.

The CRF model is a discriminative model for text sequence labeling and is configured to use lexical and grammatical features in the instruction, wherein the lexical features may include a word, lemma of the word and words of the left and right context, and wherein the grammatical features may include parts of speech and syntactic dependency of the word and context words. In accordance with the present disclosure, the features are extracted using a generic NLP library, Spacy (https://spacy.io/).

Even if it is assumed that the task prediction is an accurate process, ambiguity in natural language instruction may lead to identification failure or misprediction, especially when it comes from a non-expert user (human). State of the art task identification models are generally trained with verbs that are present in the instruction and the linguistic features around the verbs. However, a non-expert user may use verbs that are unseen for the model or use an ambiguous usage of the verb not present in the training data. In such scenarios, the task prediction may be incorrect or the task may not be predicted with a high confidence (above the empirically determined threshold). Traditionally, in these scenarios, the robot engages with the human in a conversation to determine the meaning of the instruction or the correct task type in case of misprediction. For example, if the robot is unable to predict the task type, it can ask the human for the same. However, a non-expert user may not be aware of the terminologies used by the robot. Thus, a non-expert may not be able to give correct answers to direct questions such as, "what type of task is this?" simply because the human may not know or remember the task types known to the robot knows or the human may not be aware of the convention used for categorizing the task type.

The present disclosure addresses this challenge at the step 304B, wherein a mixed-initiative dialogue is initiated with the human to confirm the identified task by dynamically generating a set of questions based on a first question template. In an embodiment, the first question template may be represented one of the templates shown in Table II.

TABLE II

Question templates for task disambiguation

| Task type | Template |
|---|---|
| Motion | Should I move to location? |
| Taking | Do you want me to pick up object? |
| Bringing | Should I bring object to location? |
| Change-state | Do you want me to turn intended-state the device? |
| Placing | Do you want me to put the object in location? |

Accordingly, the robot may inform the human (possibly, a non-expert user) of its knowledge of task types by asking suggestive questions, such as, "Is this task similar to (suggestion)?". In this case, the human may give a binary response yes/no, which is more likely to be correct. However, another challenge that may exist in a practical scenario is that the number of task types known by the robot may not be small. If the robot suggests them one by one to the human, it degrades user experience. Hence, it is critical that the robot asks only the most probable task types. Accordingly, the robot may provide one or more alternate task types from the Knowledge Base in the form of one or more binary questions, based on likelihood of the alternate task types being a true task type. The robot may also confirm similarity of the instruction to one or more tasks in the Knowledge Base.

In accordance with an embodiment of the present disclosure, the step of providing one or more alternate task types comprises obtaining a count associated with each task type in the Knowledge Base; dynamically assigning a probability to each task type using linguistic features of associated instruction, such that a sum of assigned probabilities is 1; ranking each task type in an order of decreasing probability; and generating a question for each task based on a rank associated thereof by replacing a verb slot in the instruction with a verb for an associated task and replacing slots of the one or more arguments with the predicted one or more arguments.

The step of providing the one or more alternate task types may be further detailed, in an embodiment, as explained hereinafter. For a given instruction, decoding the task may be jointly characterized by both the verb and the nouns phrases that act as the arguments of the verb. The task-argument relationships present in a dataset (the same dataset used to train the parser) may be exploited to estimate the likelihood of a known task being conveyed. Formally, given a sentence S and a set of possible task types, $T=\{T_1, T_2, \ldots T_n\}$, an n-tuple, T' is estimated, such that each element $T'_i$ denotes a task type from T and the sequence of T' is given by the likelihood of $T'_i$ being the true task type for the sentence, i.e., $P(T_i|S)$.

In an embodiment, T' is estimated using the following procedure. Firstly, possible argument types present in the instruction are obtained. The fourth multiclass classifier realized as a CRF model may be represented as, $$P(at'_{1:M}|w_{1:M}) \propto \exp(\Sigma_M \Sigma_K W_k \theta_k(at'_{i-1}, at'_i, w_i)).$$

The fourth multiclass classifier is different from the third multiclass classifier in that this model predicts the IOB tags of the argument type $at'_i$ for each word $w_i$ without considering the task types for the sentence. It is hypothesized that if a task type cannot be determined from the features, the probable arguments present in the instruction can provide evidence for the task type. Secondly, the predicted $at'_i$ are converted to a set of argument types in the sentence given by $AT_P$. Another set $AT_D$ defines a set of argument types of a task type present in an instruction in the training dataset D. The number of instances of task type $T_i$ that satisfies $AT_P \in AT_D$ is counted for all the instructions in the training dataset. This generates an n-tuple, where the elements are from the set T, ordered by the corresponding counts. The counts are normalized using a softmax function to convert it into a probability distribution, and then the n-tuple is sorted by the probabilities, which finally gives T'. To enable learning from past interactions, D also includes an annotated history of the instructions successfully planned earlier. Furthermore, during the normalization, the counts from past interactions may be given more weight to give preference to user-specific vocabulary over offline training data. After asking about all the task types in T', the dialogue flow determines that the robot is unable to perform the task. In such a scenario, an expert's intervention may be required.

Another practical scenario to address is a fact that a non-expert user may not be able understand the suggestion or alternate task types provided by the robot since the human is unaware of the convention of defining the task type. In this case, the human may ask to clarify the meaning of the task. While asking about the task type prediction and the alternatives, the robot needs to convey the meaning of the task type to the human through the question. The question needs to be carefully crafted, so that a human who is not aware of the terminologies used by the robot, can understand the question. As an example, consider the ambiguous instruction: "Put on the display". This instruction is predicted with low confidence as a task of changing the state of a device because of the ambiguous verb Put, but it could also mean a placing task. However, a question like "Do you want me to do a state change task?" is less likely to be understood properly. Instead, using the first question template to frame questions preserves the similarity of the question with the original instruction.

Figure 5:
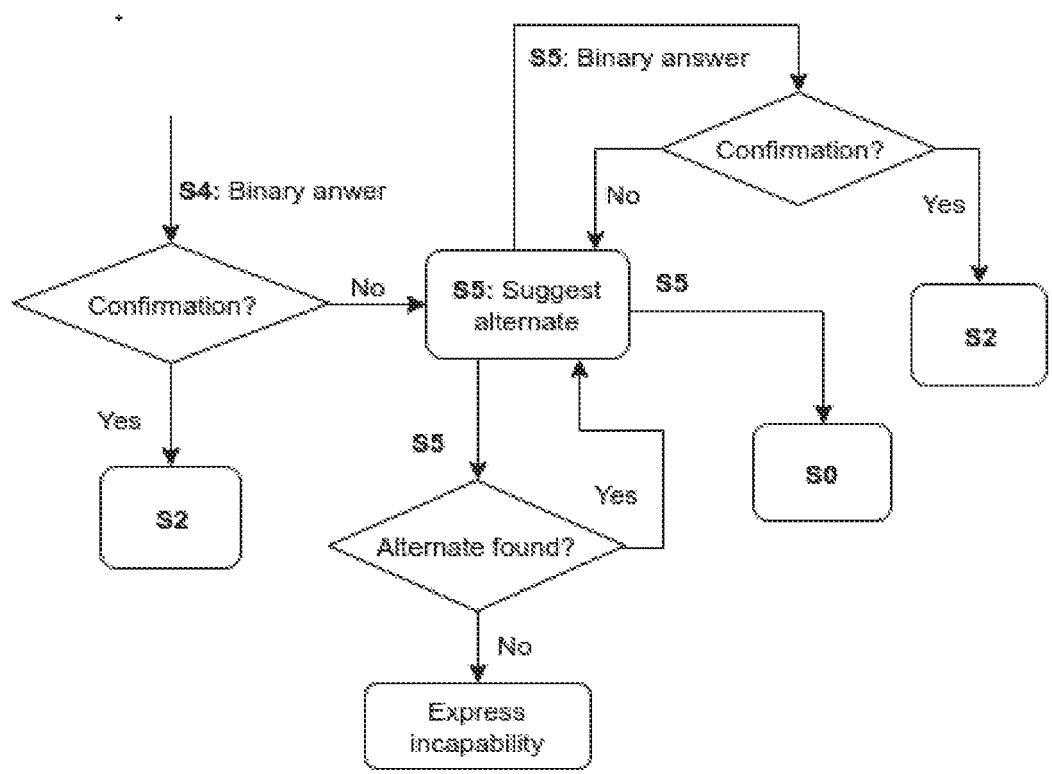
FIG. 5 illustrates a flowchart of a dialogue flow to resolve task disambiguation, in accordance with some embodiments of the present disclosure.

The underlined words shown in the Table II denote unfilled argument slots. The slots are filled by extracting the arguments from the instruction using the task type for which the confirmation is being asked. For the same example, the robot frames the question "Do you want me to turn on the display?", which is better understood. If a slot is unfilled, i.e., not mentioned in the instruction, a generic phrase denoting the argument type is used to fill the argument slot. For example, to ask if the instruction conveys a placing task, the question is framed as "Do you want me to put the display in somewhere?". FIG. 5 illustrates a flowchart of a dialogue flow to resolve task disambiguation, in accordance with some embodiments of the present disclosure. Another example of answering a human's question about definitions of the task types is if a non-expert is asked to clarify the meaning of a placing task. The robot may use the template, "Do you want me to put [theme] in [goal]?". The dialogue may be as follows:
Human: Add some water to the bowl.
Robot: Is this task similar to placing?
Human: I did not understand.
Robot: Do you want me to put some water in the bowl?
Human: Yes.
Robot: Got it.

In accordance with the present disclosure, in order to obtain a missing value associated with the obtained at least one mandatory argument, the mixed-initiative dialogue may be initiated with the human by dynamically generating a set of questions based on a second question template and synonyms of the identified task, if the at least one mandatory argument is shared across multiple task types. Alternatively, a predefined set of questions may be asked, if the at least one mandatory argument is a unique argument for the identified task. In an embodiment, the second question template may be represented one of the templates shown in Table III below.

TABLE III

Question templates to elicit missing arguments

| Task type | Missing argument | Template |
| --- | --- | --- |
| Taking, Bringing | Source location | From where do I Verb it? |
| Bringing, Placing | Goal location | Where should I Verb it? |
| Change-state | Device | Which device do I turn on/off? |
| Searching | Area to search | Where do I search for it? |

For instance, if the source is missing from an instruction of a taking task, question template, "From where do I take it?" is used. A high-level task specified by a non-expert may also be a composition of known tasks. The robot initiates the mixed-initiative dialogue with the human to extract the sequence of known tasks. In this scenario, the robot may ask the human to list the steps to perform the high-level task. The response may then be treated as a single instruction containing multiple serialized tasks.

Figure 6:
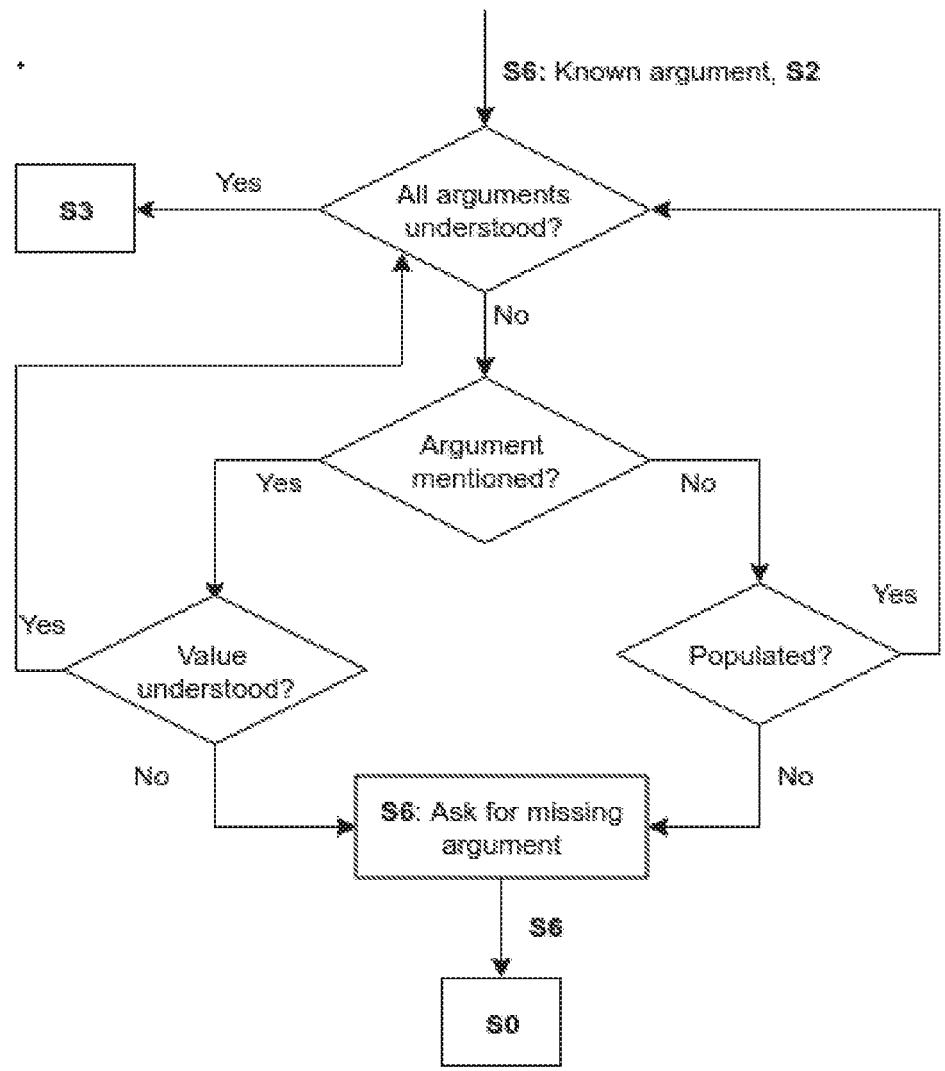
FIG. 6 illustrates a flowchart of a dialogue flow to obtain arguments associated with the task type, in accordance with some embodiments of the present disclosure.

In accordance with an embodiment of the present disclosure, the one or more processors 104 are configured to obtain, at step 306, the value associated with each of the at least one mandatory argument based on a task template for the identified task and the world model, the task template being comprised in the Knowledge Base. In accordance with the present disclosure, the task template is context based. A task template consists of pre-conditions and post-conditions to be satisfied for executing the task. The pre-conditions and post-conditions may vary significantly with the number of conditions and task context. As a result, the state-of-the-art approach of classifying the task instruction to a predefined task-action pair is not sufficient. For example, if the robot is instructed to bring an object to another location, the source location of the object needs to be specified if that information is neither present in the instruction, nor stored in Knowledge Base. But if the robot is already holding the object, for the same instruction, the source location need not be mentioned. It may also happen that the argument itself can be ambiguous. For example, if there are multiple doors in the room, for an instruction to go to a door, the robot asks for disambiguation by showing the choices. Thus, satisfying the pre-conditions are based on the context (state of world model and the model of the robot) and does not necessitate obtaining the values for all the arguments. For example, if the robot is already holding a pen and the instruction is bring me a pen, the robot need not pick the pen up. FIG. 6 illustrates a flowchart of a dialogue flow to obtain arguments associated with the task type, in accordance with some embodiments of the present disclosure. If the type of argument is known but the value is not stored in the Knowledge Base, the robot asks to provide a valid value for the argument. Alternatively, the robot checks if the argument can be populated using the world model from the Knowledge Base. Else, the robot asks the human to specify the missing information.

Figure 7:
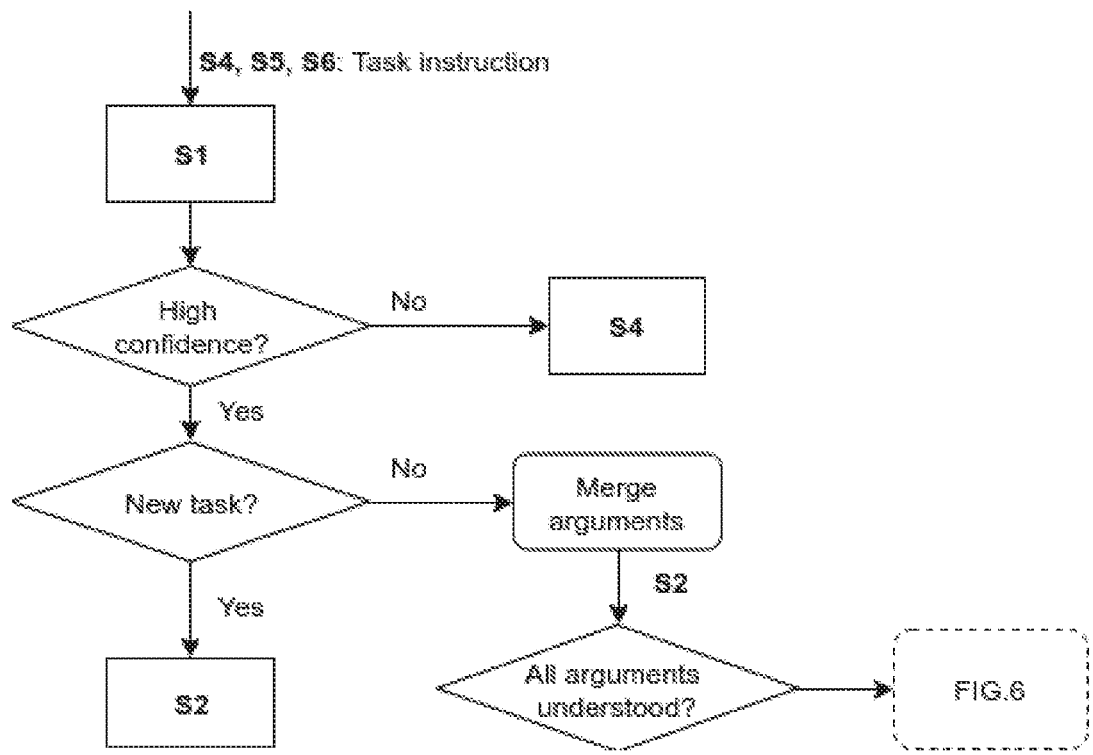
FIG. 7 illustrates a flowchart for a dialogue flow continuity, in accordance with some embodiments of the present disclosure.

In accordance with the present disclosure, the method 300 maintains dialogue continuity even if unexpected answers are received. FIG. 7 illustrates a flowchart for a dialogue flow continuity, in accordance with some embodiments of the present disclosure. The robot expects binary answers while asking to confirm a task type prediction in the states S4 and S5 shown in FIG. 4 and FIG. 5 respectively. However, it is possible that the utterance is a new utterance in the natural language by the human which may be a modified form of the instruction or a new instruction. As an example, for the question "Do you want me to turn on the display?", the human may respond "Turn it on", also referring to the noun display by the pronoun it. Similarly, when the robot asks to provide a missing argument in the state S6 shown in FIG. 6, instead of answering in a word or phrase, the answer may re-iterate the original instruction with the required argument. For example, in response to the question "From where do I take it?", the human may answer "Take it from the table". Moreover, the human may give a new task or may simply intend to end the conversation. In accordance with the present disclosure, the first multiclass classifier predicts the intent conveyed by the response from the human provided in the states S4, S5 and S6. If the intent is classified to be an instruction, then the task type is predicted. If the task type is predicted with high confidence and is of same type as the one in a current session, the dialogue moves to validating the values associated with the arguments as illustrated in FIG. 6. For a low confidence prediction, the dialogue continues to task disambiguation as illustrated in FIG. 5. For instructions with multiple tasks, the tasks are assumed to be planned and executed in a serial order, preserving the context across the tasks. For such instructions with multiple tasks, arguments are often referred by pronouns. For example, in the instruction, "Take a pen and bring it to me", the argument pen in the taking task is referred by the pronoun it in the next bringing task. A co-reference resolver is used to replace such anaphoric references.

In accordance with an embodiment of the present disclosure, the one or more processors 104 are configured to generate, at step 308, a context aware input to a task planner for the identified task, wherein the context aware input is a task plan generated using the pre-condition template and the post-condition template from the Knowledge Base for the identified task, the value associated with each of the at least one mandatory argument and the world model. In an embodiment, if the arguments are valid and fulfil the requirements of the task plan, the dialogue flow moves to a Plan and execute (S3) state. In an embodiment, the context aware input to the task planner is in a Planning Domain Definition Language (PDDL) format when the task planner is a Metric FF planner provided by J. Hoffmann et al. in the *Journal of Artificial Intelligence Research*.

A task planner requires an initial state template (TI), a goal state template (TG), state of the world model or world state (W) and Dictionary of parsed arguments (P) to process the task plan. In accordance with the present disclosure, the context aware input generated at step 308 comprises the parsed arguments and the world state (current state of a robot and its environment) is available in the Knowledge Base. The pseudo code provided below enables generating of the initial state template and the goal state template needed for the planner to plan the identified tasks. For instance, if there is a task of bringing an object, it may require at some level the initial state to be robot having an empty hand and the goal state being the object is in the robot's hand. In accordance with an embodiment of the present disclosure, the step of generating the context aware input to the task planner comprises generating such states by the pseudo code provided below.

The pseudo code for generation of a planning problem, in accordance with an embodiment, is as given below.

```
Function: Generate_planning_problem: Generate a set of non-contradicting
initial and goal state(s) for a given set of parsed arguments.
Input: Initial state template (TI), Goal state template (TG),
World state (W), Dictionary of parsed arguments (P).
init_state=[ ];
goal_state=[ ];
for template in TI do
    grounded_value = Ground(template, P);
    flag = False;
    for each element in W do
        if Check_contradiction(element, grounded_value) == True then
            init_state.append(element);
            Flag= True;
    if flag == False do
        init_state.append(grounded_value);
for each template in TG do
    grounded_value = Ground(template, P);
    goal_state.append(grounded_value);
return init_state, goal_state;
Function: Ground: Provided the grounded value for a given template and
set of parsed arguments
Input: Template (T), Dictionary of parsed arguments (P).
grounded_value = [ ];
for i in length(T) do
    for k in length(P) do
        argument_type = P[k].type;
        argument_value = P[k].value;
        if T[i] == argument_type then
            grounded_value.append(argument_value);
return grounded_value;
Function: Check_contradiction: Checks if two states are contradicting
Input: Element of the world state (E), Grounded_value (G).
for i in length(E) do
    predicate = E[i].predicate;
    argument1 = E[i].argument1;
    argument2 = E[i].argument2;
    for k in length(G) do
        predicate_new, argument1_new, argument2 _new
        if G[k].predicate == predicate then
            if G[k].argument2 ==Null then
                return True;
            else
                if G[k].argument2 ==Null then
                    if G[k].argument1 == argument_2 then
                        return True;
return False;
```

In accordance with an embodiment of the present disclosure, the one or more processors 104 are configured to complete, at step 310, the session based on one of execution of the generated task plan based on the task plan, or generating a communication indicative of either a session closing greeting, inability of the robot to execute the identified task or failure to parse the utterance.

EVALUATION

The HuRIC corpus provided by E. Bastianelli, et al. in the *Proceedings of the Ninth International Conference on Language Resources and Evaluation* was used to train the multiclass classifiers of the present disclosure. The performance of the second multiclass classifier, the third multiclass classifier and the fourth multiclass classifier (language understanding models) on the test data (80:20 train-test split) of the HuRIC is shown in Table IV below.

TABLE IV

Accuracy of the language understanding models on HuRIC dataset

| Model | Precision | Recall | F1 |
| --- | --- | --- | --- |
| Second multiclass classifier - Task type prediction | 92 | 91 | 91 |
| Third multiclass classifier - Argument identification | 93 | 94 | 93 |
| Fourth multiclass classifier - Argument prediction without a task type association feature function | 83 | 86 | 83 |

To evaluate a system in accordance with an embodiment of the present disclosure, a natural language instruction dataset from Rockin@Home (http://rockinrobotchallenge.eu/home.php) was used. The dataset is divided into four groups, each group containing a set of audio files with their transcriptions and annotations using FrameNet. The transcriptions are taken as an input to the system of the present disclosure and its task understanding and planning capabilities were evaluated. To evaluate the performance of the dialogue flow for task disambiguation of the present disclosure, the VEIL dataset provided by D. K. Misra et al. in *The International Journal of Robotics Research* 2016 was used. The VEIL dataset contains human-provided instructions to perform different tasks, also in a domestic service robotics scenario. The instructions in VEIL are more natural, ambiguous and contains many novel verbs that the task identification process of the present disclosure is not trained with.

Performance of the task identification process: Table V below provides different methods used for task understanding and plan generation.

| System | Instruction understanding | Plan generation |
| --- | --- | --- |
| Baseline | Using semantic parser alone | Static templates |
| Interactive task understanding | Using dialogue for missing information along with the parser | Static templates |
| Interactive task understanding and contextual planning | Using dialogue for missing information along with the parser | Templates updated by the world model |
| Complete plan generation model | Using a co-reference resolver along with the parser, dialogue for missing information | Templates updated by the world model |

It was noted that the frame semantic parser of the present disclosure could correctly identify 420 out of 439 (95.7%) tasks present in total 393 instructions as shown in Table VI below. Clearly, the parser is very accurate in predicting the task types from natural language instructions.

TABLE VI

Task identification performance on the Rockin@Home dataset

| Group | # of instructions | # of tasks | # of correct predictions |
|---|---|---|---|
| Robocup | 144 | 163 | 153 (93.8%) |
| Rockin1 | 115 | 134 | 129 (96.3%) |
| Rockin2 | 114 | 120 | 117 (97.5%) |
| Rockin2014 | 20 | 22 | 21 (95.5%) |

It may be noted from Table VII below, that even presence of a highly accurate parser, the performance of the baseline system degrades considerably in plan generation.

TABLE VII

Plan generation performance on the Rockin@Home dataset

| System | Group | Plan generated |
|---|---|---|
| Baseline | Robocup | 95 (58.3%) |
| | Rockin1 | 53 (39.5%) |
| | Rockin2 | 35 (29.1%) |
| | Rockin2014 | 8 (36.3%) |
| Interactive task understanding | Robocup | 138 (84.6%) |
| | Rockin1 | 110 (82.1%) |
| | Rockin2 | 98 (81.6%) |
| | Rockin2014 | 19 (86.3%) |
| Interactive task understanding and contextual planning | Robocup | 148 (90.7%) |
| | Rockin1 | 120 (89.5%) |
| | Rockin2 | 103 (85.8%) |
| | Rockin2014 | 21 (95.4%) |
| Complete plan generation model | Robocup | 152 (93.2%) |
| | Rockin1 | 122 (91.0%) |
| | Rockin2 | 105 (87.5%) |
| | Rockin2014 | 21 (95.4%) |

The baseline system generates plans for 191 tasks, which his only 43.5% of the total tasks. This is because in many of the instructions, one or more arguments are missing and the baseline system doesn't use dialogues to get the missing information. Also, because of static templates, planning problems are not generated for the instructions that contain multiple tasks with conflicting goal states.

By adding a dialogue module to get the missing arguments (Interactive task understanding), the performance improves by a high degree as seen in Table VII. A total of 333 plans were generated which is 83.1% of the total tasks. To be able to evaluate such a large number of instructions, a simulated human participant was used. The simulated participant gives the correct answer to the question about a missing argument if that argument is not present in the instruction; otherwise, it does not provide an answer. This dialogue solves the problem of incomplete instructions, but complex instructions that require context-sensitive planning cannot be handled by the static templates.

This is further improved by the Interactive task understanding and contextual planning system which generates plans for 392 tasks or 89.3% of the total tasks. Even though the model generates plans for many instructions that contain dependent sub-tasks with conflicting goal conditions, it is unable to do so for some instructions where Anaphora is used to refer entities, e.g. Take the pen and bring it to me.

A state-of-the art co-reference resolver that takes a text and returns it with pronouns was used. This led to successful plan generation for 400 tasks or 91.1% of the total tasks. This matches closely with the percentage of tasks correctly understood (95.7%). The reason for the tasks being predicted correctly but valid plans not being generated is because the simulated human does not provide arguments that are present in the instruction. Also, in some scenarios, a planning failure of a task leads to failure of dependent tasks in the same instruction because of incorrectly assumed context.

The system of the present disclosure uses a dialogue flow to generate plans for instructions that are incorrectly parsed, either because it contains a novel verb or the instruction is ambiguous. In both cases, one mandatory question is asked to verify whether the original prediction (with low confidence) is correct or not. If the original prediction is correct, then the system proceeds with plan generation; otherwise, it starts to ask questions about the similarity of the given task with known tasks. In accordance with the present disclosure, a sequence of questions is provided so that the correct answer can be found by asking a minimal number of questions. The dialogue flow of the present disclosure was evaluated against a baseline strategy that uses *WordNet* provided by G. A. Miller. The baseline strategy is motivated by the fact that WordNet has been used to find semantically similar tasks. The baseline computes the similarity between the verbs that are most commonly used (based on training dataset) to specify a task. Then it provides the list of questions to be asked by ranking using the similarity score given by WordNet.

The baseline system and the system of the present disclosure were evaluated using instructions from the VEIL dataset. The instructions containing novel verbs and their most similar task types are shown below in Table VIII.

TABLE VIII

Instructions containing a novel verb (in boldface) and the most similar task type

| Instruction | Task type |
|---|---|
| Add some water to the bowl | Placing |
| Gather all the cups | Bringing |
| Dump the bowl into the trash | Placing |
| Drop it in trash can | Placing |
| Grasp the book | Taking |
| Set some pillows on the couch too | Bringing |
| Pour the contents of the pot into a bowl | Placing |
| Throw the bottle in the trash | Placing |
| Collect the cups from the table | Taking |
| Release the bag | Placing |

For the ambiguous instructions, the original task prediction and the actual task type retrieved through the dialogue strategy are shown in Table IX below.

TABLE IX

Examples of ambiguous instructions that results in incorrect initial prediction compared to the intended task type. Through dialogue, finally the intended task type is retrieved.

| Instruction | Intended task | Initial prediction |
|---|---|---|
| Move the remote near tv | Bringing | Motion |
| Turn to the right | Motion | Change-state |
| Put on the TV | Change-state | Placing |
| Keep the same pace as he has | Following | Taking |
| Go to the kitchen with him | Following | Motion |
| Take the tray to the bedroom | Bringing | Taking |

Figure 8:
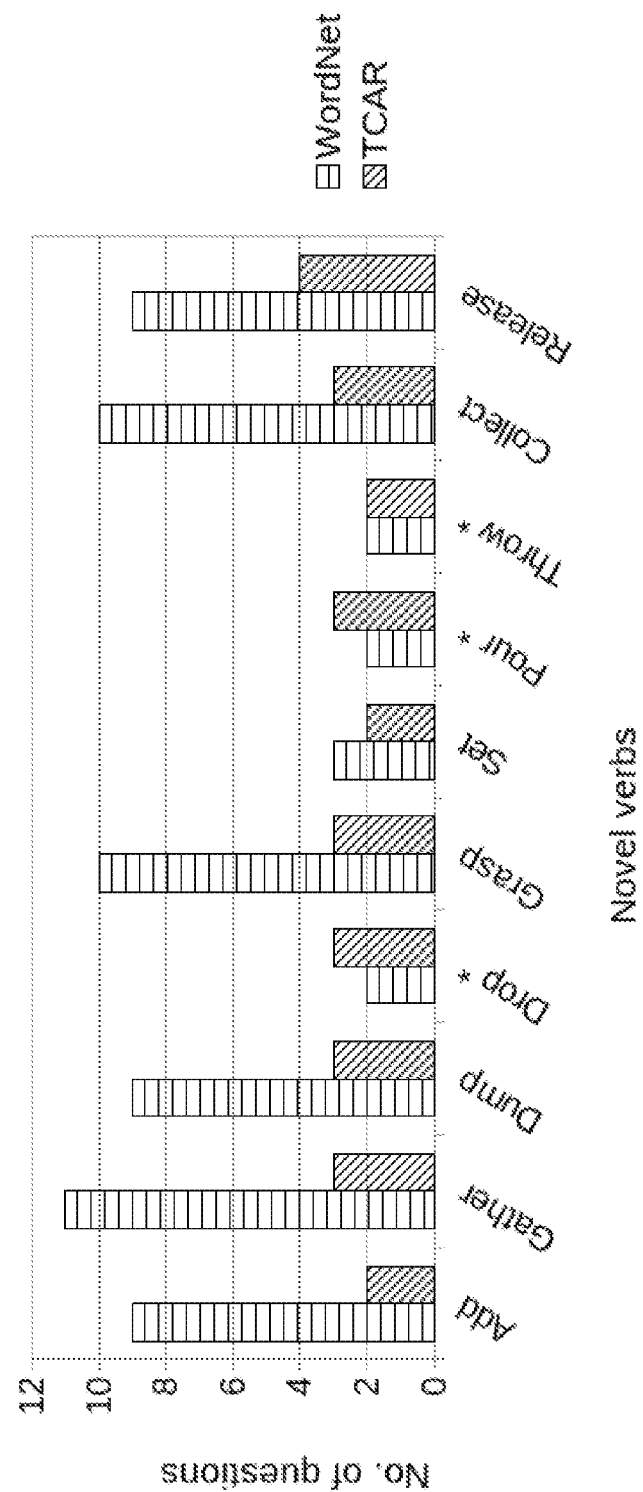
FIG. 8 illustrates a graphical illustration of evaluation of the dialogue flow of the present disclosure with WordNet, a lexical database for English, wherein the graphical illustration depicts number of questions asked to understand novel verbs.
Figure 9:
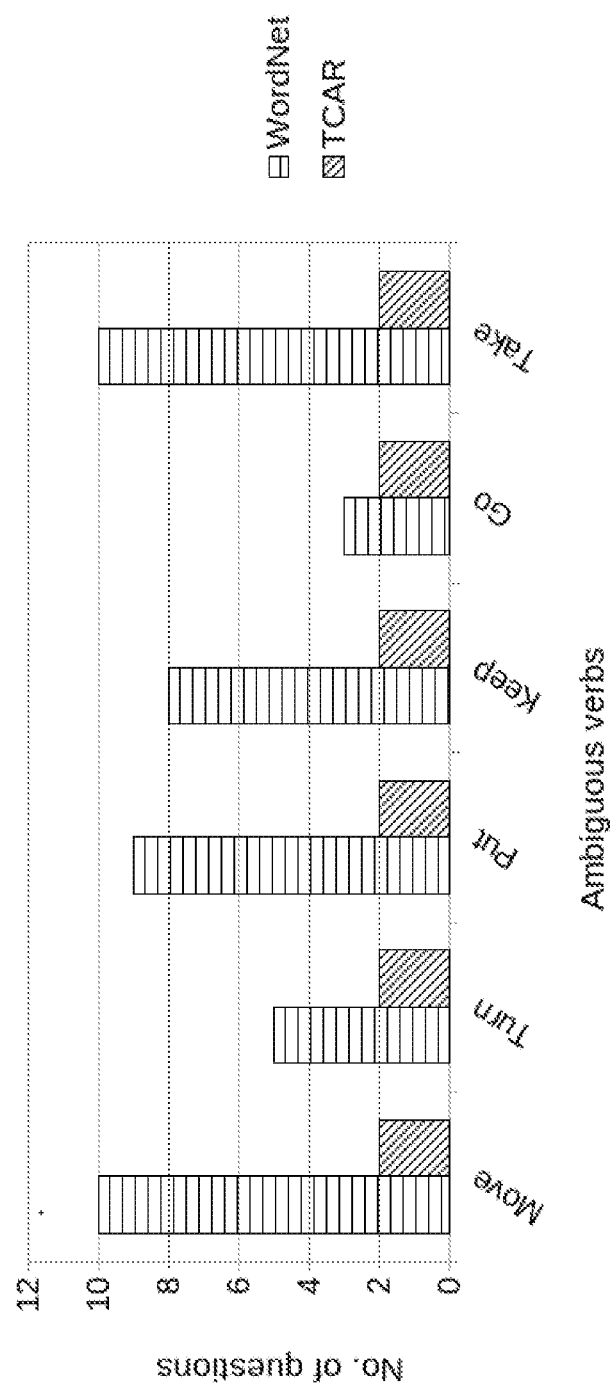
FIG. 9 illustrates a graphical illustration of evaluation of the dialogue flow of the present disclosure with WordNet, a lexical database for English, wherein the graphical illustration depicts number of questions asked for ambiguous instructions.

FIG. 8 illustrates a graphical illustration of evaluation of the dialogue flow of the present disclosure with WordNet, a lexical database for English, wherein the graphical illustration depicts number of questions asked to understand novel verbs. FIG. 9 illustrates a graphical illustration of evaluation of the dialogue flow of the present disclosure with WordNet, a lexical database for English, wherein the graphical illustration depicts number of questions asked for ambiguous instructions. As shown in FIG. 8, the WordNet baseline strategy asks 67 questions to understand novel verbs, whereas the system of the present disclosure asks only 27 questions for 10 instructions given in total. The WordNet baseline asks a smaller or similar set of questions when the novel verb is a synonym of the most common verb of the task. In cases where the novel verb is not a synonym but has a similar meaning in the context, the system of the present disclosure asks a much lesser number of questions. For ambiguous instructions, the system of the present disclosure always asks a much lesser number of questions than the WordNet baseline, as shown in FIG. 9. This is because the system of the present disclosure exploits the task-argument relationships present in the training data to suggest the most likely alternatives. The WordNet baseline model asks 45 questions in total for the 6 ambiguous instructions shown in Table IX, whereas the system of the present disclosure asks only 12 questions. An important point to note that the WordNet baseline model is unable to provide an answer when a non-expert user does not understand the question and asks for clarification. This is because the model calculates the task similarity score but cannot predict the possible argument types that are required by the templates to correctly explain the task.

Providing task instructions to a cohabitant robot through natural conversation adds to the usability and acceptability of the robot, especially for a non-expert user. Systems and methods of the present disclosure facilitate resolving ambiguity or missing pieces of information in natural language instructions using a mixed-initiative dialogue flow that gathers requisite information with minimal question-answer iterations and only when necessary. Generating a context aware input for a task planner based on a Knowledge Base that is a current reflection of the world model and model of the robot facilitates effective task identification in a natural language conversation.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for robotic task identification using a natural language based conversation, the method comprising the steps of:

predicting, via one or more hardware processors serving as a first multiclass classifier, an intent associated with an utterance in a natural language, wherein the utterance initiates a session being a unit of the natural language based conversation, with the intent being one of an instruction, a greeting, a statement or a general query pertaining to a current state of a robot or environment thereof represented by a world model comprised in a Knowledge Base;

responding, via the one or more hardware processors, to the predicted intent by performing at least one of:

identifying a task, if the predicted intent is the instruction to perform the task, wherein the task is associated with a task type, and wherein the task type is associated with at least one mandatory argument having a value associated thereof;

initiating a mixed-initiative dialogue with a human to confirm the identified task, if the predicted task type is associated with a confidence score equal to or below an empirically determined threshold; and providing a response from a pre-defined response template comprised in the Knowledge Base, if the identified intent is one of the greeting, the statement, the general query pertaining to the current state of the robot or environment thereof; and obtaining, via the one or more processors, the value associated with each of the at least one mandatory argument based on a task template for the identified task and the world model, the task template being comprised in the Knowledge Base;

generating, via the one or more processors, a context aware input to a task planner for the identified task, wherein the context aware input is a task plan generated using a pre-condition template and a post-condition template from the Knowledge Base for the identified task, the value associated with each of the at least one mandatory argument and the world model; and completing, via the one or more processors, the session based on one of execution of the generated task plan based on the task plan, or generating a communication indicative of either a session closing greeting, inability of the robot to execute the identified task or failure to parse the utterance.

2. The processor implemented method of claim 1, wherein the step of predicting an intent associated with an utterance is preceded by pre-processing the utterance, wherein the pre-processing comprises one or more of tokenization, Part-Of-Speech (POS) tagging, Dependency parsing, stop word removal, tf-idf (term frequency-inverse document frequency) and coreference resolution.

3. The processor implemented method of claim 1, wherein the step of identifying a task is preceded by pre-processing the utterance, wherein the pre-processing comprises one or more of tokenization, Part-Of-Speech (POS) tagging, Dependency parsing, stop word removal, tf-idf (term frequency-inverse document frequency) and coreference resolution.

4. The processor implemented method of claim 2, wherein the step of identifying a task comprises:

parsing the instruction to predict the task type using a second multiclass classifier; and obtaining the at least one mandatory argument associated with the predicted task type, if the predicted task type is associated with the confidence score above the empirically determined threshold, by performing one of:

identifying the at least one mandatory argument using a third multiclass classifier; and predicting the at least one mandatory argument using a fourth multiclass classifier without a task type association feature function.

5. The processor implemented method of claim 4, wherein the step of initiating a mixed-initiative dialogue with the human to confirm the identified task comprises one or more of:

dynamically generating a set of questions based on a first question template for confirming the predicted task type by the human;

providing one or more alternate task types from the Knowledge Base in the form of one or more binary questions, based on likelihood of the alternate task types being a true task type; and confirming similarity of the instruction to one or more tasks in the Knowledge Base.

6. The processor implemented method of claim 5, wherein the step of obtaining the at least one mandatory argument further comprises initiating the mixed-initiative dialogue with the human to obtain a missing value associated with the obtained at least one mandatory argument by dynamically generating a set of questions based on i) a second question template and synonyms of the identified task, if the at least one mandatory argument is shared across multiple task types or ii) a predefined set of questions, if the at least one mandatory argument is a unique argument for the identified task.

7. The processor implemented method of claim 5, wherein the step of providing one or more alternate task types comprises:

obtaining a count associated with each task type in the Knowledge Base;

dynamically assigning a probability to each task type using linguistic features of associated instruction, such that a sum of assigned probabilities is 1;

ranking each task type in an order of decreasing probability; and generating a question for each task based on a rank associated thereof by replacing a verb slot in the instruction with a verb for an associated task and replacing slots of the one or more arguments with the predicted one or more arguments.

8. The processor implemented method of claim 6, wherein the utterance is a new utterance in the natural language by the human received as a modified form of the instruction or a new instruction, in response to the one or more binary questions from the dynamically generated set of questions.

9. A system for robotic task identification using a natural language based conversation, the system comprising:

one or more data storage devices operatively coupled to one or more hardware processors and configured to store instructions configured for execution via the one or more hardware processors to:

predict, via a first multiclass classifier, an intent associated with an utterance in a natural language, wherein the utterance initiates a session being a unit of the natural language based conversation, with the intent being one of an instruction, a greeting, a statement or a general query pertaining to a current state of a robot or environment thereof represented by a world model comprised in a Knowledge Base;

respond to the predicted intent by performing at least one of:

identifying a task, if the predicted intent is the instruction to perform the task, wherein the task is associated with a task type, and wherein the task type is associated with at least one mandatory argument having a value associated thereof;

initiating a mixed-initiative dialogue with a human to confirm the identified task, if the predicted task type is associated with a confidence score equal to or below an empirically determined threshold; and providing a response from a pre-defined response template comprised in a Knowledge Base, if the identified intent is one of the greeting, the statement, the general query pertaining to the current state of the robot or environment thereof; and obtain the value associated with each of the at least one mandatory argument based on a task template for the identified task and the world model, the task template being comprised in the Knowledge Base;

generate a context aware input to a task planner for the identified task, wherein the context aware input is a task plan generated using a pre-condition template and a post-condition template from the Knowledge Base for the identified task, the value associated with each of the at least one mandatory argument and the world model; and complete the session based on one of execution of the generated task plan based on the task plan, or generate a communication indicative of either a session closing greeting, inability of the robot to execute the identified task or failure to parse the utterance.

10. The system of claim 9, wherein the one or more processors are further configured to pre-process the utterance before predicting the intent associated with the utterance and before identifying a task by performing one or more of tokenization, Part-Of-Speech (POS) tagging, Dependency parsing, stop word removal, tf-idf (term frequency-inverse document frequency) and coreference resolution.

11. The system of claim 10, wherein the one or more processors are further configured to identify the task by:

parsing the instruction to predict the task type using a second multiclass classifier; and obtaining the at least one mandatory argument associated with the predicted task type, if the predicted task type is associated with the confidence score above the empirically determined threshold, by performing one of:

identifying the at least one mandatory argument using a third multiclass classifier; and predicting the at least one mandatory argument using a fourth multiclass classifier without a task type association feature function.

12. The system of claim 11, wherein the one or more processors are further configured to perform the step of initiating the mixed-initiative dialogue with the human to confirm the identified task by performing one or more of:

dynamically generating a set of questions based on a first question template for confirming the predicted task type by the human;

providing one or more alternate task types from the Knowledge Base in the form of one or more binary questions, based on likelihood of the alternate task types being a true task type; and confirming similarity of the instruction to one or more tasks in the Knowledge Base.

13. The system of claim 12, wherein the one or more processors are further configured to obtain the at least one mandatory argument by initiating the mixed-initiative dialogue with the human to obtain a missing value associated with the obtained at least one mandatory argument by dynamically generating a set of questions based on i) a second question template and synonyms of the identified task, if the at least one mandatory argument is shared across multiple task types or ii) a predefined set of questions, if the at least one mandatory argument is a unique argument for the identified task.

14. The system of claim 12, wherein the one or more processors are further configured to provide one or more alternate task types by:

obtaining a count associated with each task type in the Knowledge Base;

dynamically assigning a probability to each task type using linguistic features of associated instruction, such that a sum of assigned probabilities is 1;

ranking each task type in an order of decreasing probability; and generating a question for each task based on a rank associated thereof by replacing a verb slot in the instruction with a verb for an associated task and replacing slots of the one or more arguments with the predicted one or more arguments.

15. The system of claim 13, wherein the utterance is a new utterance in the natural language by the human received as a modified form of the instruction or a new instruction, in response to the one or more binary questions from the dynamically generated set of questions.

16. The system of claim 15, wherein the first multiclass classifier is a logistic regression classifier; and the second multiclass classifier, the third multiclass classifier and the fourth multiclass classifier are each a Conditional Random Field (CRF) model.

17. A computer program product comprising a non-transitory computer readable medium having a computer readable program embodied therein, wherein the computer readable program, when executed on a computing device, causes the computing device to:

predict, via a first multiclass classifier, an intent associated with an utterance in a natural language, wherein the utterance initiates a session being a unit of the natural language based conversation, with the intent being one of an instruction, a greeting, a statement or a general query pertaining to a current state of a robot or environment thereof represented by a world model comprised in a Knowledge Base;

respond to the predicted intent by performing at least one of:

identifying a task, if the predicted intent is the instruction to perform the task, wherein the task is associated with a task type, and wherein the task type is associated with at least one mandatory argument having a value associated thereof;

initiating a mixed-initiative dialogue with a human to confirm the identified task, if the predicted task type is associated with a confidence score equal to or below an empirically determined threshold; and providing a response from a pre-defined response template comprised in a Knowledge Base, if the identified intent is one of the greeting, the statement, the general query pertaining to the current state of the robot or environment thereof; and obtain the value associated with each of the at least one mandatory argument based on a task template for the identified task and the world model, the task template being comprised in the Knowledge Base;

generate a context aware input to a task planner for the identified task, wherein the context aware input is a task plan generated using a pre-condition template and a post-condition template from the Knowledge Base for the identified task, the value associated with each of the at least one mandatory argument and the world model; and complete the session based on one of execution of the generated task plan based on the task plan, or generate a communication indicative of either a session closing greeting, inability of the robot to execute the identified task or failure to parse the utterance.

* * * * *